US010458291B2

(12) United States Patent
Spangler et al.

(10) Patent No.: US 10,458,291 B2
(45) Date of Patent: Oct. 29, 2019

(54) COVER PLATE FOR A COMPONENT OF A GAS TURBINE ENGINE

(71) Applicant: UNITED TECHNOLOGIES CORPORATION, Farmington, CT (US)

(72) Inventors: Brandon W. Spangler, Vernon, CT (US); Russell J. Bergman, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 327 days.

(21) Appl. No.: 15/252,874

(22) Filed: Aug. 31, 2016

(65) Prior Publication Data
US 2016/0369632 A1 Dec. 22, 2016

Related U.S. Application Data

(63) Continuation of application No. 13/539,806, filed on Jul. 2, 2012, now Pat. No. 9,500,099.

(51) Int. Cl.
F01D 25/12 (2006.01)
F01D 5/18 (2006.01)
(Continued)

(52) U.S. Cl.
CPC ............... F01L 5/18 (2013.01); F01D 5/187 (2013.01); F01D 9/02 (2013.01); F01D 25/12 (2013.01); F02C 3/04 (2013.01); F04D 29/324 (2013.01); F04D 29/542 (2013.01); F04D 29/582 (2013.01); F05D 2220/32 (2013.01); F05D 2240/35 (2013.01); F05D 2240/81 (2013.01);
(Continued)

(58) Field of Classification Search
CPC .......... F01D 25/12; F01D 9/02; F01D 29/324; F01D 29/542; F01D 29/582; F05D 2240/11; F05D 2260/201; F05D 5/18; F05D 5/187
USPC ........................................ 415/115; 416/97 R
See application file for complete search history.

(56) References Cited

U.S. PATENT DOCUMENTS 3,628,880 A   12/1971   Smuland
3,800,864 A    4/1974   Hauser et al.
(Continued)

OTHER PUBLICATIONS

International Preliminary Report on Patentability for International Application No. PCT/US2013/047225 dated Jan. 15, 2015.
(Continued)

Primary Examiner — Mark A Laurenzi
Assistant Examiner — Deming Wan
(74) Attorney, Agent, or Firm — Carlson, Gaskey & Olds, P.C.

(57) ABSTRACT

A component for a gas turbine engine includes a platform having a non-gas path side and a gas path side, an airfoil extending from the gas path side of the platform, and a cover plate positioned adjacent to the non-gas path side of the platform. The cover plate can include a first plurality of openings that communicate a first portion of a cooling air to a first cooling cavity of the platform and a second plurality of openings that can communicate a second portion of the cooling air to the second cooling cavity that is separate from the first cooling cavity. Each of the first cooling cavity and the second cooling cavity can include a plurality of augmentation features.

23 Claims, 3 Drawing Sheets

(51) Int. Cl.
  *F01D 9/02* (2006.01)
  *F01L 5/18* (2006.01)
  *F02C 3/04* (2006.01)
  *F04D 29/32* (2006.01)
  *F04D 29/54* (2006.01)
  *F04D 29/58* (2006.01)

(52) U.S. Cl.
  CPC .... *F05D 2250/11* (2013.01); *F05D 2260/201* (2013.01); *F05D 2260/22141* (2013.01)

(56) References Cited

U.S. PATENT DOCUMENTS

| | | | |
|---|---|---|---|
| 4,017,213 A | 4/1977 | Przirembel | |
| 4,693,667 A | 9/1987 | Lenz et al. | |
| 4,712,979 A | 12/1987 | Finger | |
| 4,749,333 A | 6/1988 | Bonner et al. | |
| 5,145,315 A | 9/1992 | North et al. | |
| 5,413,458 A | 5/1995 | Calderbank | |
| 5,746,573 A | 5/1998 | Junkin et al. | |
| 6,120,249 A | 9/2000 | Hultgren et al. | |
| 6,142,730 A * | 11/2000 | Tomita | F01D 5/187 415/114 |
| 6,386,825 B1 | 5/2002 | Burdgick | |
| 6,506,013 B1 | 1/2003 | Burdgick et al. | |
| 6,517,312 B1 | 2/2003 | Jones et al. | |
| 6,899,518 B2 | 5/2005 | Lucas et al. | |
| 6,984,101 B2 | 1/2006 | Schiavo, Jr. | |
| 7,695,247 B1 | 4/2010 | Liang | |
| 8,038,399 B1 | 10/2011 | Liang | |
| 2002/0037217 A1* | 3/2002 | Itzel | F01D 5/18 415/115 |
| 2004/0247435 A1 | 12/2004 | Cervenka | |
| 2005/0281663 A1* | 12/2005 | Trindade | F01D 5/18 415/1 |
| 2006/0056968 A1 | 3/2006 | Jacala et al. | |
| 2008/0190114 A1 | 8/2008 | Surace et al. | |
| 2009/0028692 A1 | 1/2009 | Surace et al. | |
| 2010/0129196 A1 | 5/2010 | Johnston et al. | |
| 2010/0266386 A1 | 10/2010 | Broomer et al. | |
| 2011/0229305 A1 | 9/2011 | Bergman et al. | |
| 2012/0020768 A1* | 1/2012 | Krueckels | F01D 5/187 415/1 |

OTHER PUBLICATIONS

International Search Report and Written Opinion for International Application No. PCT/US2013/047225 dated Sep. 23, 2013.
Extended European Search Report for European Application No. 13 812 737.8, dated Mar. 3, 2016.

* cited by examiner

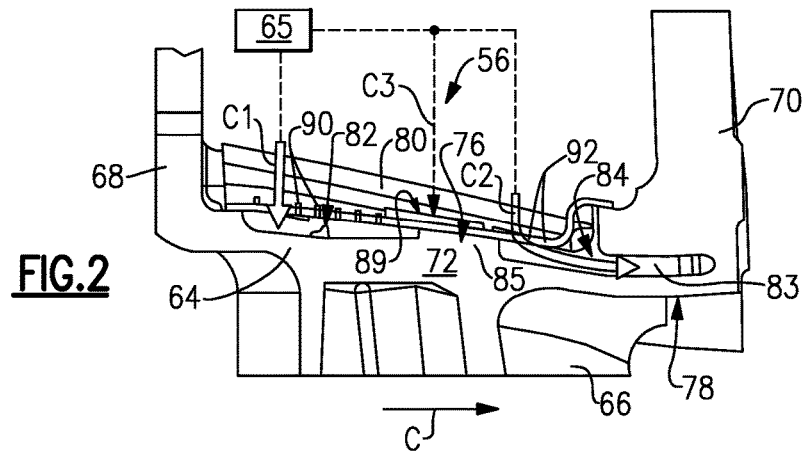
FIG.2
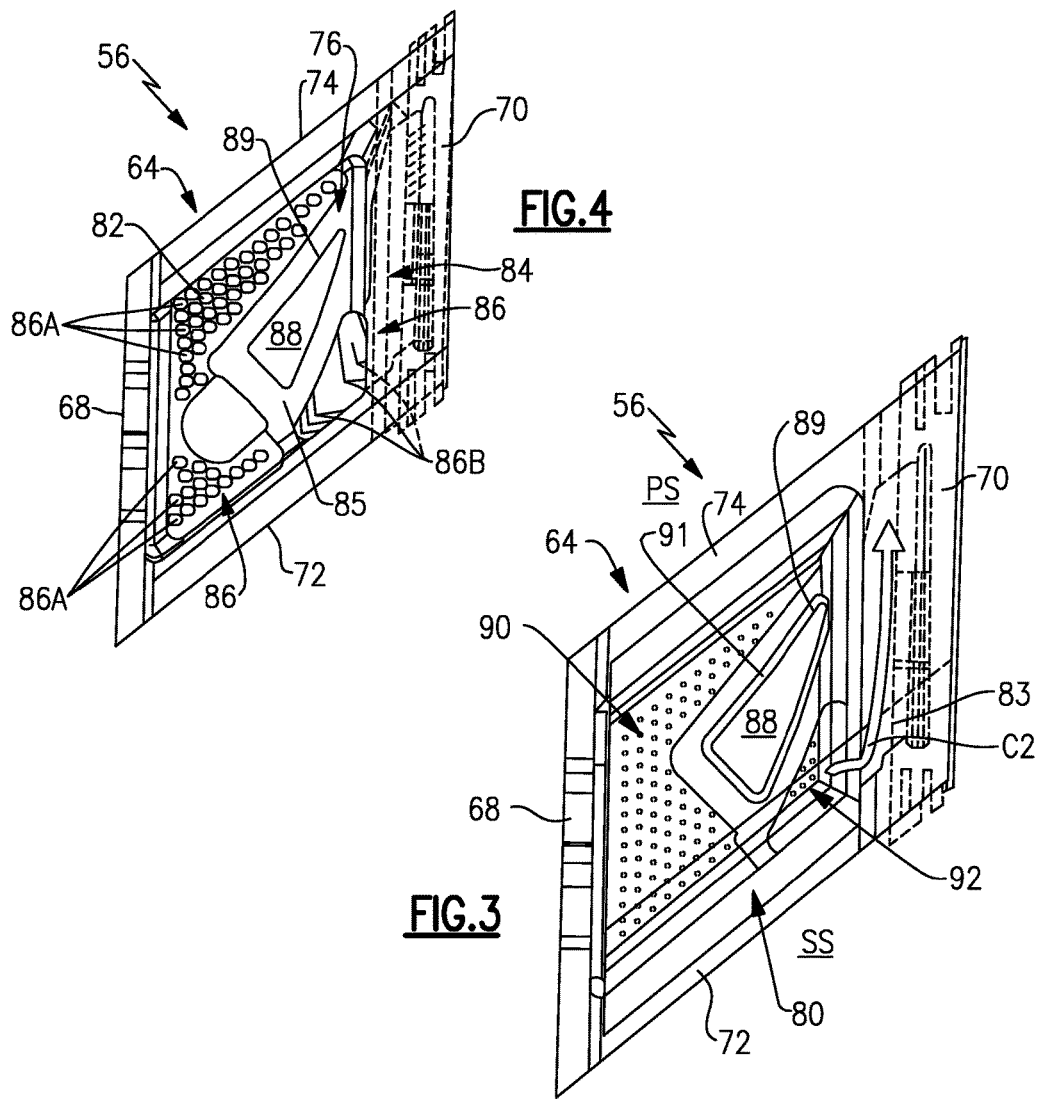
FIG.4
FIG.3

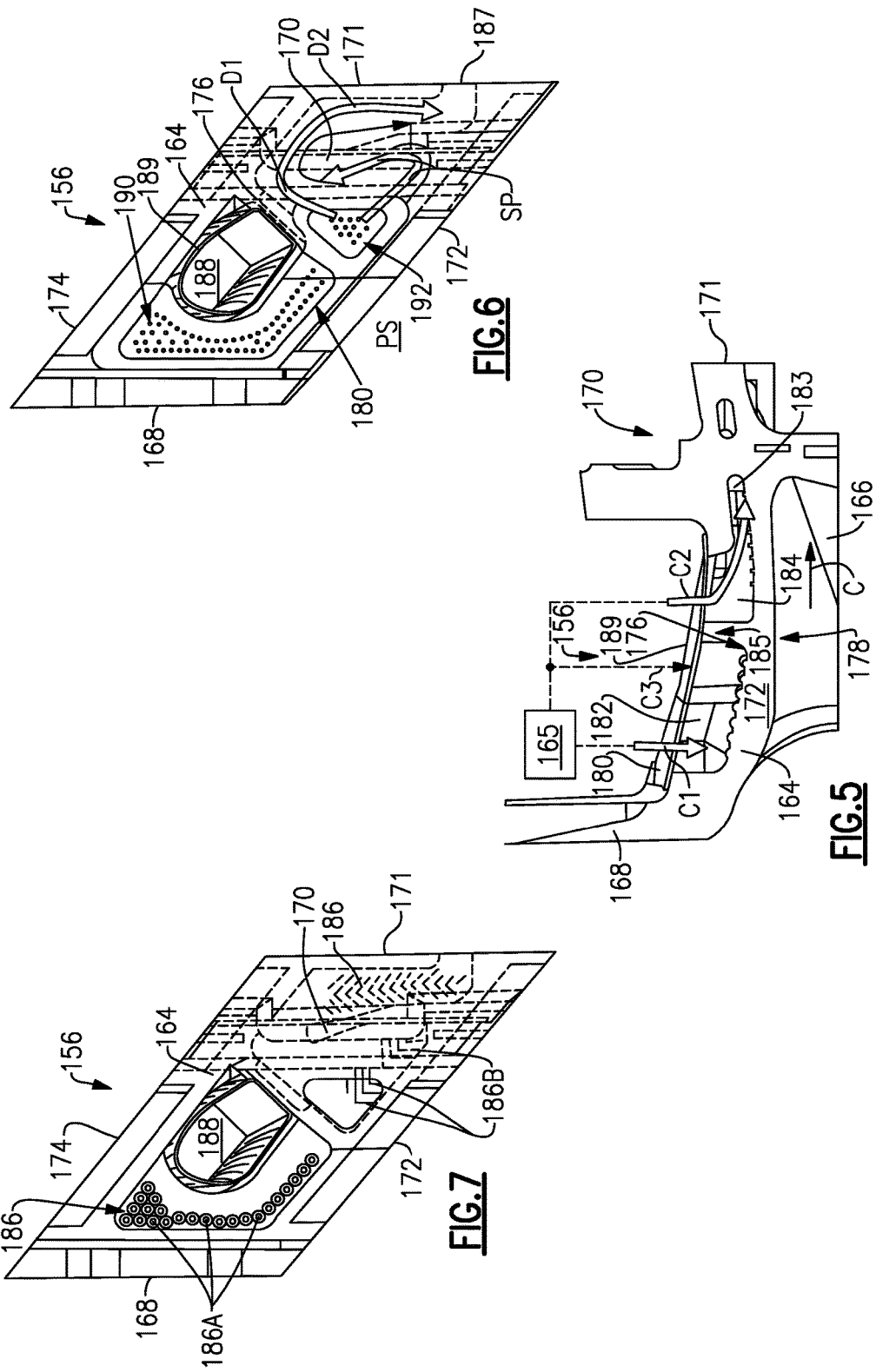

COVER PLATE FOR A COMPONENT OF A GAS TURBINE ENGINE

CROSS REFERENCE TO RELATED APPLICATION

This is a continuation of U.S. patent application Ser. No. 13/539,806, which was filed on Jul. 2, 2012.

BACKGROUND

This disclosure relates generally to a gas turbine engine, and more particularly to a component that can be incorporated into a gas turbine engine. The component can include a cover plate for providing dedicated cooling to portions of a platform of the component.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections of a gas turbine engine may include alternating rows of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes prepare the airflow for the next set of blades. These blades and vanes are examples of components that may need cooled by a dedicated source of cooling air in order to withstand the relatively high temperatures of the hot combustion gases that are communicated along the core flow path of a gas turbine engine.

SUMMARY

A component for a gas turbine engine according to an exemplary embodiment of the present disclosure includes, among other possible things, a platform having a non-gas path side and a gas path side, an airfoil extending from the gas path side of the platform, and a cover plate positioned adjacent to the non-gas path side of the platform. The cover plate can include a first plurality of openings that communicate a first portion of a cooling air to a first cooling cavity of the platform and a second plurality of openings that can communicate a second portion of the cooling air to the second cooling cavity that is separate from the first cooling cavity. Each of the first cooling cavity and the second cooling cavity can include a plurality of augmentation features.

In a further embodiment of the foregoing component for a gas turbine engine embodiment, the platform can include an outer diameter platform.

In a further embodiment of either of the foregoing embodiments, the platform can include an inner diameter platform.

In a further embodiment of any of the foregoing embodiments, the component can include a turbine blade.

In a further embodiment of any of the foregoing embodiments, the cover plate can be received at least partially about an opening of an internal core of the airfoil.

In a further embodiment of any of the foregoing embodiments, the first plurality of openings can include impingement holes and the second plurality of openings can exclude impingement holes.

In a further embodiment of any of the foregoing embodiments, the second plurality of openings can be positioned adjacent to a trailing edge rail of the platform.

In a further embodiment of any of the foregoing embodiments, the second cooling cavity can radially extend between a trailing edge rail and the gas path side of the component.

In a further embodiment of any of the foregoing embodiments, the second plurality of openings can be configured in a triangular shaped pattern.

A gas turbine engine according to another exemplary embodiment of the present disclosure includes a compressor section, a combustor section in fluid communication with the compressor section and a turbine section in fluid communication with the combustor section. One of the compressor section and the turbine section includes at least one component having a platform and an airfoil extending from the platform. The platform can include a non-gas path side and a cover plate positioned at the non-gas path side. The cover plate can include a first plurality of openings that communicate a first portion of a cooling air to a first cooling cavity on the platform and a second plurality of openings that can communicate a second portion of the cooling air to a second cooling cavity of the platform that is separate from the first cooling cavity. Each of the first cooling cavity and the second cooling cavity can include a plurality of augmentation features.

In a further embodiment of the foregoing gas turbine engine embodiment, the at least one component is a vane.

In a further embodiment of either of the foregoing embodiments, the second plurality of openings can be positioned adjacent to a trailing edge rail of the platform and face a suction side of the airfoil.

In a further embodiment of any of the foregoing embodiments, the second plurality of openings can be positioned adjacent to a trailing edge rail of the platform and face a pressure side of the airfoil.

In a further embodiment of any of the foregoing embodiments, the plurality of augmentation features can include at least one of pin fins and chevron trip strips.

A method of cooling a component of a gas turbine engine according to yet another exemplary embodiment of the present disclosure includes communicating a first portion of a cooling air through a first plurality of openings of a cover plate positioned relative to a platform of the component to impingement cool a first cooling cavity of the platform. A second portion of the cooling air is communicated through a second plurality of openings of the cover plate to cool a second cooling cavity of a platform using a cooling method different than impingement cooling.

In a further embodiment of the foregoing embodiment, the second cooling cavity is separate from the first cooling cavity.

In a further embodiment of either of the foregoing embodiments, at least a portion of the second cooling cavity can extend radially between a trailing edge rail and a gas path side of the platform.

In a further embodiment of any of the foregoing embodiments, the second portion of the cooling air is communicated radially through the second plurality of openings, and is then circulated axially, and is then communicated circumferentially through the second cooling cavity.

In a further embodiment of any of the foregoing embodiments, the second portion of the cooling air is communicated along a serpentine path through the second cooling cavity.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 2 and 3 illustrate a component that can be incorporated into a gas turbine engine.

FIG. 4 illustrates the component of FIGS. 2 and 3 with a cover plate removed.

FIGS. 5 and 6 illustrate another component that can be incorporated into a gas turbine engine.

FIG. 7 illustrates the component of FIGS. 5 and 6 with a cover plate removed.

DETAILED DESCRIPTION

Figure 1:
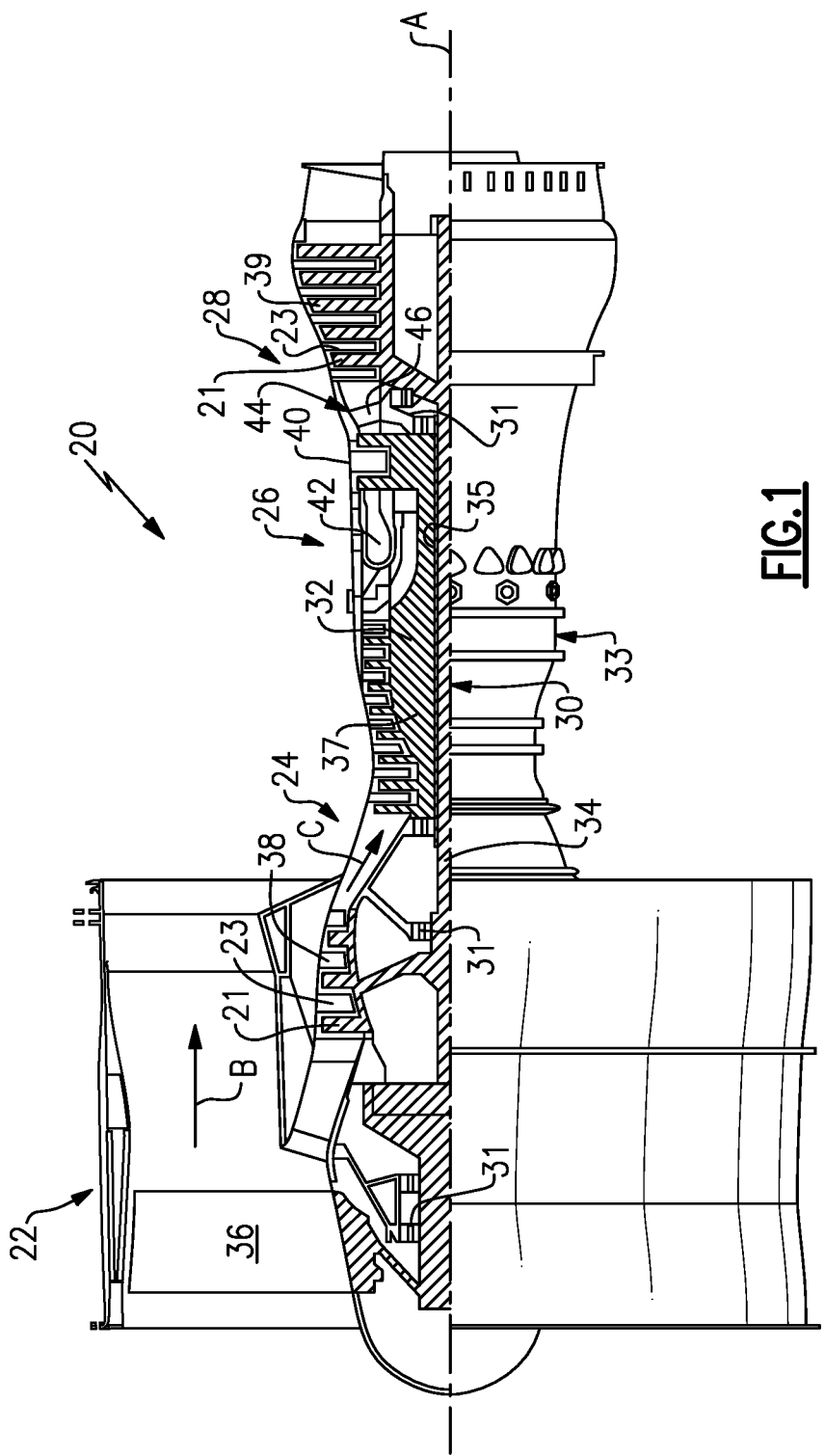
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems or features. The fan section 22 drives air along a bypass flow path B, while the compressor section 24 drives air along a core flow path C for compression and communication into the combustor section 26. The hot combustion gases generated in the combustor section 26 are expanded through the turbine section 28 for powering numerous gas turbine engine loads. Although depicted as a turbofan gas turbine engine in this non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that additional bearing systems may alternatively or additionally be provided.

The low speed spool 30 generally includes an inner shaft 34 that interconnects a fan 36, a low pressure compressor 38 and a low pressure turbine 39. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 supports one or more bearing systems 31 of the turbine section 28. The mid-turbine frame 44 may include one or more airfoils 46 that may be positioned within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

Each of the compressor section 24 and the turbine section 28 may include alternating rows of rotor assemblies and vane assemblies (shown schematically). The rotor assemblies carry a plurality of rotating blades 25, while each vane assembly can carry a plurality of vanes 27. The blades 25 of the rotor assemblies create or extract energy (in the form of pressure) from core airflow that is communicated through the gas turbine engine 20. The vanes 27 of the vane assemblies direct airflow to the blades of the rotor assemblies to either add or extract energy.

Various components of the gas turbine engine 20, including but not limited to the vanes 27 and blades 25 of the compressor section 24 and the turbine section 28, may be subjected to repetitive thermal cycling under widely ranging temperatures and pressures. The components of the turbine section 28 are particularly subjected to relatively extreme operating conditions. Therefore, some components may be cooled in order to withstand the relatively extreme operating conditions that are experienced within the core flow path C.

FIGS. 2 and 3 illustrate a component 56 that can be incorporated into a gas turbine engine, such as the gas turbine engine 20 of FIG. 1. In this exemplary embodiment, the component 56 represents a turbine vane. However, the teachings of this disclosure are not limited to turbine vanes and could extend to other components of the gas turbine engine 20, including but not limited to, compressor blades and vanes, turbine blades, or other components.

The component 56 can include a platform 64 and an airfoil 66 that extends from the platform 64. In this disclosure, the term "platform" is meant to encompass either an outer diameter platform or an inner diameter platform. However, in this particular embodiment, the platform 64 is represented as an outer diameter platform of a vane. It should be understood that the component 56 could also include an inner diameter platform (not shown) on an opposite side of the airfoil 66 from the platform 64.

The platform 64 includes a leading edge rail 68, a trailing edge rail 70, and opposing mate faces 72, 74. The platform 64 axially extends between the leading edge rail 68 and the trailing edge rail 70 and circumferentially extends between the opposing mate faces 72, 74. The opposing mate faces 72, 74 can be attached relative to corresponding mate faces of adjacent components of a gas turbine engine to provide a full ring assembly, such as a full ring vane assembly that can be circumferentially disposed about the engine centerline longitudinal axis A.

The platform 64 can also include a non-gas path side 76 and a gas path side 78. In other words, when the component 56 is mounted within the gas turbine engine 20, the non-gas path side 76 is positioned on a non-core flow path side of the component 56, while the gas path side 78 may establish an outer boundary of the core flow path C of the gas turbine engine 20 (See FIG. 2).

The platform 64 can include a first cooling cavity 82 and second cooling cavity 84 that is separated from the first cooling cavity 82 by a wall portion 85 of the platform 64. In this exemplary embodiment, the first cooling cavity 82 is a platform impingement cavity and the second cooling cavity is a platform core cavity. The first cooling cavity 82 and at least a portion of the second cooling cavity 84 extend radially between the non-gas path side 76 of the platform 64 and a cover plate 80 positioned relative to the non-gas path side 76 of the platform 64. The second cooling cavity 84 also extends underneath the trailing edge rail 70. As discussed in greater detail below, cooling air may be directed to and circulated within the first cooling cavity 82 and the second cooling cavity 84 to cool the platform 64.

An opening 89 of an internal core 88 of the airfoil 66 can also protrude through the non-gas path side 76 of the platform 64. The opening 89 can directly receive a cooling air to cool the internal surfaces of the airfoil 66. The opening 89 of this exemplary embodiment extends between the first cooling cavity 82 and the second cooling cavity 84. The cover plate 80 can be received around the opening 89 (See FIGS. 2 and 3) and can include a hole 91 that aligns with the opening 89 such that cooling air can be directly communicated into the internal core 88. In this exemplary embodiment, the cover plate 80 is positioned radially outwardly from the opening 89 such that the opening 89 can at least partially provide both platform cooling and airfoil cooling.

The cover plate 80 is generally received at the non-gas path side 76 between the leading edge rail 68, the trailing edge rail 70, and the opposing mate faces 72, 74 of the platform 64. The cover plate 80 can include a first plurality of openings 90 that can communicate a first portion C1 of cooling air to the first cooling cavity 82 and a second plurality of openings 92 that can communicate a second portion C2 of the cooling air to the second cooling cavity 84. A third portion C3 of the cooling air can be communicated directly past the cover plate 80 and through the opening 89 and into the internal core 88 of the airfoil 66. In this manner, both the platform 64 and the airfoil 66 can be cooled during engine operation. The cooling air stream portions C1, C2 and C3 can be communicated from a cooling air source 65. In one exemplary embodiment, the cooling air source includes a bleed airflow from the compressor section 24 or some other upstream section of the gas turbine engine 20.

In this exemplary embodiment, the first plurality of openings 90 in the cover plate 80 are impingement holes and the second plurality of openings 92 are core feed holes. The first portion C1 of the cooling air can be directed through the first plurality of openings 90 to impingement cool the platform 64 within the first cooling cavity 82. For example, the first plurality of openings 90 can redirect the first portion C1 of the cooling air to form jets of air that perpendicularly impact the non-gas path side 76 of the platform 64 in order to cool the platform 64 in the area encompassed by the first cooling cavity 82. The first portion C1 of the cooling air can exit through cooling holes drilled from the gas path side 78 into the first cooling cavity 82.

Meanwhile, the second portion C2 of the cooling air can be communicated through the second plurality of openings 92 and circulated within the second cooling cavity 84 to provide metered cooling air throughout the second cooling cavity 84. In other words, the second cooling cavity 84 is not impingement cooled like the first cooling cavity 82 but is instead cooled using a different cooling method than impingement cooling. The second portion C2 of the cooling air is communicated radially through the second plurality of openings 92 and can then be axially (See FIG. 2) and circumferentially (See FIG. 3) circulated within the second cooling cavity 84. For example, the second portion C2 of the cooling air can be communicated in a circumferential direction through a portion 83 of the second cooling cavity 84 that extends radially between the trailing edge rail 70 and the gas path side 78 of the platform 64 (See FIGS. 2 and 3). The second portion C2 of the cooling air can exit through cooling holes drilled from the gas path side 78 into the second cooling cavity 84.

In one exemplary embodiment, the first plurality of openings 90 are disposed adjacent to the leading edge rail 68 of the platform 64 and can extend toward the trailing edge rail 70 along at least a portion of the opposing mate faces 72, 74. The first plurality of openings 90 can include a greater number of openings along a side of the cover plate 80 that faces a pressure side PS of the airfoil 66 as compared to the number of openings along a side of the cover plate 80 that face the suction side SS of the airfoil 66. The actual amount, design and configuration of the first plurality of openings 90 can vary depending upon design specific parameters, including but not limited to, the cooling requirements of the component 56.

In this exemplary embodiment, the second plurality of openings 92 are positioned adjacent to the trailing edge rail 70 of the platform 64 on a suction side SS of the airfoil 66. However, it should be understood that the second plurality of openings 92 could be positioned at other locations of the cover plate 80. The second plurality of openings 92 may also be configured in a triangular shaped pattern, although other patterns are also contemplated.

FIG. 4 illustrates the platform 64 with the cover plate 80 removed. The first cooling cavity 82 and the second cooling cavity 84 can both include a plurality of augmentation features 86 that protrude in a radially outward direction from the outer face 76 of the platform 64. The plurality of augmentation features 86 may increase the heat transfer between the cooling air streams C1, C2 that are communicated through the first cooling cavity 82 and the second cooling cavity 84. In one exemplary embodiment, the plurality of augmentation features 86 are cast as part of the non-gas path side 76. However, the plurality of augmentation features 86 can be formed in any known manner.

In the illustrated embodiment, the plurality of augmentation features 86 of the first cooling cavity 82 include pin fins 86A and the plurality of augmentation features 86 of the second cooling cavity 84 include chevron trip strips 86B. However, the first cooling cavity 82 and the second cooling cavity 84 can exhibit any features, configurations and/or designs.

FIGS. 5 and 6 illustrate another exemplary component 156 that can be incorporated into the gas turbine engine 20. The component 156 is similar to the component 56 described above but may include slightly modified features. In this disclosure, like reference numerals signify like or similar features, whereas reference numerals modified by "100" signify features that may be slightly modified.

The component 156 can include a platform 164 and an airfoil 166 that extends from the platform 164. In this exemplary embodiment, the platform 164 is an inner diameter platform of a vane (depicted upside down for ease of reference). It should be understood that the component 156 could also include an outer diameter platform (not shown) on an opposite side of the airfoil 166 from the platform 164.

The platform 164 includes a leading edge rail 168, a trailing edge rail 170, a trailing edge face 171, and opposing mate faces 172, 174. The platform 164 axially extends between the leading edge rail 168 and the trailing edge face 171 and circumferentially extends between the opposing mate faces 172, 174.

The platform 164 can also include a non-gas path side 176 and a gas path side 178. When the component 156 is mounted within the gas turbine engine 20, the non-gas path side 176 is positioned on a non-core flow path side of the component 156, while the gas path side 178 establishes an outer boundary of the core flow path C of the gas turbine engine 20.

The platform 164 can include a first cooling cavity 182 and second cooling cavity 184 that is separated from the first cooling cavity 182 by a wall portion 185 of the platform 164. In this exemplary embodiment, the first cooling cavity 182 is a platform impingement cavity and the second cooling cavity 184 is a platform core cavity. The first cooling cavity 182 and at least a portion of the second cooling cavity 184 extend radially between a cover plate 180 and the non-gas path side 176 of the platform 164. The second cooling cavity 184 can also extend underneath the trailing edge rail 170. As discussed in greater detail below, cooling air may be circulated within the first cooling cavity 182 and the second cooling cavity 184 to cool the platform 164.

An opening 189 of an internal core 188 of the airfoil 166 can protrude through the non-gas path side 176 of the platform 164. The opening 189 can directly receive cooling air to cool the internal surfaces of the airfoil 166. The opening 189 of this exemplary embodiment is positioned between the first cooling cavity 182 and the second cooling cavity 184. The cover plate 180 can be received around the opening 189 such that it does not cover the opening 189 (See FIG. 6), thus allowing cooling air to be directly communicated into the internal core 188. In this exemplary embodiment, the cover plate 180 is positioned radially inwardly from the opening 189 such that the opening 189 can at least partially provide both platform cooling and airfoil cooling.

The cover plate 180 is generally received at the non-gas path side 176 between the leading edge rail 168, the trailing edge rail 170, and the opposing mate faces 172, 174 of the platform 164. In this exemplary embodiment, the cover plate 180 is L-shaped. However, the shape, size and configuration of the cover plate 180 may be design specific.

The cover plate 180 can include a first plurality of openings 190 that can communicate a first portion C1 of cooling air to the first cooling cavity 182 and a second plurality of openings 192 that can communicate a second portion C2 of the cooling air to the second cooling cavity 184. A third portion C3 of the cooling air can be communicated directly to through the opening 189 and into the internal core 188 of the airfoil 166. In this manner, both the platform 164 and the airfoil 166 can be cooled during engine operation. The cooling air streams C1, C2 and C3 can be communicated from a cooling air source 165. The cooling air source may be a bleed airflow from the compressor section 24 or some other upstream section of the gas turbine engine 20.

The first plurality of openings 190 of the cover plate 180 may include impingement holes and the second plurality of openings 192 may include core feed holes. The first portion C1 of the cooling air can be directed through the first plurality of openings 190 to impingement cool the platform 164 within the first cooling cavity 182. For example, the first plurality of openings 190 can redirect the first portion C1 of the cooling air to form jets of air that perpendicularly impact the non-gas path side 176 of the platform 164 in order to cool the platform 164 in the area encompassed by the first cooling cavity 182. The first portion C1 of the cooling air can exit through cooling holes drilled from the gas path side 178 into the first cooling cavity 182.

Meanwhile, the second portion C2 of the cooling air can be communicated through the second plurality of openings 192 and circulated within the second cooling cavity 184 to provide metered cooling air throughout the second cooling cavity 184. In other words, the second cooling cavity 184 is not impingement cooled like the first cooling cavity 182. Instead, the second portion C2 of the cooling air is communicated radially through the second plurality of openings 192 and can then be axially (See FIG. 5) and circumferentially (See FIG. 6) circulated within the second cooling cavity 184. For example, the second portion C2 of the cooling air can be communicated in at least two circumferential directions D1 and D2 to cool a space 183 that extends radially between the trailing edge rail 170 and the gas path side 178 of the platform 164. The second portion C2 of the cooling air can also be communicated along a serpentine path SP. The second portion C2 of the cooling air can exit the second cooling cavity 184 through an outlet 187 at the trailing edge face 171 or through cooling holes drill from the gas path side 178 into the second cooling cavity 184 (See FIG. 6).

In one exemplary embodiment, the first plurality of openings 190 are disposed adjacent to the leading edge rail 168 of the platform 164 and can extend toward the trailing edge rail 170 along at least a portion of the opposing mate faces 172, 174. The first plurality of openings 190 can include a greater number of openings along a side of the cover plate 180 that faces a pressure side PS of the airfoil 166 as compared to the number of openings along a side of the cover plate 180 that faces the suction side SS of the airfoil 166. The first plurality of openings 190 can also be disposed in an L-shaped pattern. The actual number of openings and the design and configuration of the first plurality of openings 190 can vary depending upon design specific parameters, including but not limited to, the cooling requirements of the component 156.

In this exemplary embodiment, the second plurality of openings 192 are positioned adjacent to the trailing edge rail 170 of the platform 164 and on the pressure side PS of the airfoil 166. The second plurality of openings 192 may be disposed in a triangular shaped pattern. However, it should be understood that the second plurality of openings 192 could be positioned at other locations of the cover plate 180 and may include various configurations and patterns.

FIG. 7 illustrates the platform 164 with the cover plate 180 removed. The first cooling cavity 182 and the second cooling cavity 184 can both include a plurality of augmentation features 186 that protrude in a radially outward direction from the outer face 176 of the platform 164. The plurality of augmentation features 186 may increase the heat transfer between the cooling air streams C1 and C2 that are communicated through the first cooling cavity 182 and the second cooling cavity 184. In one exemplary embodiment, the plurality of augmentation features 186 are cast as part of the non-gas path side 176. However, the plurality of augmentation features 186 can be formed in any known manner.

In the illustrated embodiment, the plurality of augmentation features 186 of the first cooling cavity 182 include pin fins 186A and the plurality of augmentation features 186 of the second cooling cavity 184 include chevron trip strips 186B. However, the first cooling cavity 182 and the second cooling cavity 184 can incorporate any features, configurations and/or designs.

Although the different non-limiting embodiments described herein are illustrated as having specific components, the embodiments of this disclosure are not limited to those particular combinations. It is possible to use some of the components or features from any of the non-limiting embodiments in combination with features or components from any other non-limiting embodiments.

It should also be understood that like reference numerals identify corresponding or similar elements within the several drawings. It should further be understood that although a particular component arrangement is disclosed and illustrated in these exemplary embodiments, other arrangements can also benefit from the teachings of this disclosure.

The foregoing description shall be interpreted as illustrative and not in any limiting sense. A worker of ordinary skill in the art would recognize that various modifications could come within the scope of this disclosure. For these reasons, the following claims should be studied to determine the true scope and content of this disclosure.

What is claimed is:

1. A component for a gas turbine engine, comprising:
a platform having a non-gas path side and a gas path side, and said platform having a leading edge rail and a trailing edge rail extending outwardly from said non-gas path side;
an airfoil extending from said gas path side of said platform;
a cover plate positioned adjacent to said non-gas path side of said platform, said cover plate including a first plurality of openings that communicate a first portion of a cooling air to a first cooling cavity of said platform and a second plurality of openings that communicate a second portion of said cooling air to a second cooling cavity that is separate from said first cooling cavity, and each of said first cooling cavity and said second cooling cavity include a plurality of augmentation features, and said cover plate is a single cover plate configured to cover both of said first cooling cavity and said second cooling cavity;
said first plurality of openings are impingement holes configured to direct said first portion of said cooling air for impingement cooling said first cooling cavity;
said second plurality of openings are core feed holes configured to direct said second portion of said cooling air for providing metered cooling within said second cooling cavity; and
wherein said second cooling cavity radially extends between said trailing edge rail and said gas path side of the component.

2. The component as recited in claim 1, wherein said platform is an outer diameter platform.

3. The component as recited in claim 1, wherein said platform is an inner diameter platform.

4. The component as recited in claim 1, wherein the component is a turbine vane.

5. The component as recited in claim 1, wherein said cover plate is received at least partially about an opening of an internal core of said airfoil.

6. The component as recited in claim 5, wherein:
said core feed holes are configured to communicate said second portion of said cooling air radially through said second plurality of openings, then axially within said second cooling cavity in a direction toward said trailing edge rail, and then circumferentially within said second cooling cavity.

7. The component as recited in claim 6, wherein each of said core feed holes is oriented such that a portion of said second portion of said cooling air communicated by said core feed holes does not impingement cool any surfaces of said second cooling cavity.

8. The component as recited in claim 6, wherein said second cooling cavity is arranged such that said second portion of said cooling air is communicated in at least two circumferential directions.

9. The component as recited in claim 1, wherein said second plurality of openings are positioned adjacent said trailing edge rail of said platform.

10. The component as recited in claim 1, wherein said cover plate is configured to communicate a third portion of said cooling air directly into an internal core of said airfoil.

11. The component as recited in claim 1, wherein said second plurality of openings are configured in a triangular shaped pattern.

12. The component as recited in claim 1, wherein said core feed holes are configured to communicate said second portion of said cooling air radially through said second plurality of openings, and then axially within said second cooling cavity, and then circumferentially within said second cooling cavity.

13. The component as recited in claim 12, wherein said cover plate is received between and abuts against said leading edge rail and said trailing edge rail.

14. A component for a gas turbine engine comprising:
a platform having a non-gas path side and a gas path side;
an airfoil extending from said gas path side of said platform;
a cover plate positioned adjacent to said non-gas path side of said platform, said cover plate including a first plurality of openings that communicate a first portion of a cooling air to a first cooling cavity of said platform and a second plurality of openings that communicate a second portion of said cooling air to a second cooling cavity that is separate from said first cooling cavity, and each of said first cooling cavity and said second cooling cavity include a plurality of augmentation features, and said cover plate is a single cover plate configured to cover both of said first cooling cavity and said second cooling cavity;
said first plurality of openings are impingement holes configured to direct said first portion of said cooling air for impingement cooling said first cooling cavity;
said second plurality of openings are core feed holes configured to direct said second portion of said cooling air for providing metered cooling within said second cooling cavity; and
wherein said core feed holes are configured to communicate said second portion of said cooling air radially through said second plurality of openings, and then axially within said second cooling cavity, and then circumferentially within said second cooling cavity.

15. The component as recited in claim 14, wherein said platform includes a wall portion that extends radially away from said non-gas path side to abut against said cover plate and separate said first and second cooling cavities.

16. A gas turbine engine, comprising:
a compressor section;
a combustor section in fluid communication with said compressor section;
a turbine section in fluid communication with said combustor section;
wherein one of said compressor section and said turbine section includes at least one component, said at least one component including a platform and an airfoil extending from said platform, wherein said platform includes a non-gas path side and a gas path side and a cover plate positioned at said non-gas path side, said platform having a leading edge rail and a trailing edge rail extending outwardly from said non-gas path side, wherein said cover plate includes a first plurality of openings that communicate a first portion of a cooling air to a first cooling cavity of said platform and a second plurality of openings that communicate a second portion of said cooling air to a second cooling cavity of said platform that is separate from said first cooling cavity, and each of said first cooling cavity and said second cooling cavity include a plurality of augmentation features, said cover plate configured as a single cover plate configured to cover both said first cooling cavity and said second cooling cavity;

said first plurality of openings are impingement holes configured to direct said first portion of said cooling air for impingement cooling said first cooling cavity;

said second plurality of openings are core feed holes configured to direct said second portion of said cooling air for providing metered cooling within said second cooling cavity; and wherein said second cooling cavity radially extends between said trailing edge rail and said gas path side of said at least one component.

17. The gas turbine engine as recited in claim 16, wherein said second plurality of openings are positioned adjacent to said trailing edge rail of said platform and face a suction side of said airfoil.

18. The gas turbine engine as recited in claim 16, wherein said second plurality of openings are positioned adjacent to said trailing edge rail of said platform and face a pressure side of said airfoil.

19. The gas turbine engine as recited in claim 16, wherein said plurality of augmentation features include at least one of pin fins and chevron trip strips.

20. The gas turbine engine as recited in claim 16, wherein said core feed holes are configured to communicate said second portion of said cooling air radially through said second plurality of openings, and then axially within said second cooling cavity, and then circumferentially within said second cooling cavity.

21. A component for a gas turbine engine, comprising:
a platform having a non-gas path side and a gas path side, and said platform having a leading edge rail and a trailing edge rail extending outwardly from said non-gas path side;
an airfoil extending from said gas path side of said platform; and
a cover plate positioned adjacent to said non-gas path side of said platform, said cover plate including:
a plurality of impingement holes configured to communicate a first portion of a cooling air for cooling said platform in an area encompassed by a first cooling cavity of said platform;
a plurality of core feed holes configured to communicate a second portion of said cooling air for cooling said platform in an area encompassed by a second cooling cavity of said platform, wherein said second cooling cavity radially extends between said trailing edge rail and said gas path side of the component; and
a hole aligned with an opening of an internal core of said airfoil, said hole configured to communicate a third portion of said cooling air into said internal core for cooling said airfoil.

22. The component as recited in claim 21, wherein said core feed holes are configured to communicate said second portion of said cooling air radially through a plurality of openings in said cover plate, and then axially within said second cooling cavity, and then circumferentially within said second cooling cavity.

23. The component as recited in claim 22, wherein said cover plate is received around said opening such that said hole and said cover plate are radially aligned.

* * * * *